United States Patent [19]
Adamson

[11] Patent Number: 5,867,671
[45] Date of Patent: Feb. 2, 1999

[54] VIRTUAL DEVICE FOR PERFORMING AN OPERATION IN RESPONSE TO A SCSI COMMAND DIFFERENT THAN THE OPERATION OF A SCSI DEVICE RESPONDING TO THE SCSI COMMAND

[75] Inventor: Alan P. Adamson, San Diego, Calif.

[73] Assignee: NCR Corporation, Dayton, Ohio

[21] Appl. No.: 752,765

[22] Filed: Nov. 20, 1996

[51] Int. Cl.⁶ .................................................. G06F 15/16
[52] U.S. Cl. ................ 395/306; 395/183.15; 395/183.21
[58] Field of Search ..................................... 395/309, 308, 395/310, 825, 306, 500, 183.15, 183.21

[56] References Cited

U.S. PATENT DOCUMENTS

| | | | |
|---|---|---|---|
| 4,982,324 | 1/1991 | McConaughy et al. | 364/200 |
| 5,265,252 | 11/1993 | Rawson, III et al. | 395/700 |
| 5,287,453 | 2/1994 | Roberts | 395/200 |
| 5,421,014 | 5/1995 | Bucher | 395/650 |
| 5,513,328 | 4/1996 | Christofferson | 395/280 |
| 5,721,880 | 2/1998 | McNeill, Jr. et al. | 395/527 |

*Primary Examiner*—Meng-Ai T. An
*Assistant Examiner*—Rupal D. Dharia
*Attorney, Agent, or Firm*—Gregory A. Welte

[57] ABSTRACT

A module for executing SCSI commands. The module includes a computer process, and communicates with a SCSI bus, which carries SCSI commands. Ordinarily, the SCSI commands cause specific actions in SCSI devices: for example, a given SCSI command may cause a SCSI printer to eject a sheet of paper. The module also responds to the SCSI commands, but in a manner determined by its programming, and not necessarily consistent with SCSI conventions. For example, the module may respond to the command just identified by looking up the time-of-day, and presenting the time-of-day to the SCSI bus, for any interested parties to observe.

11 Claims, 5 Drawing Sheets

VIRTUAL DEVICE FOR PERFORMING AN OPERATION IN RESPONSE TO A SCSI COMMAND DIFFERENT THAN THE OPERATION OF A SCSI DEVICE RESPONDING TO THE SCSI COMMAND

The invention uses the Small Computer System Interface (SCSI) to implement a virtual device, which shares a SCSI bus with other devices. The virtual device responds to SCSI commands, and performs tasks which its programming dictates. The other devices take the form of normal hardware.

BACKGROUND OF THE INVENTION

FIG. 1 is a simplified schematic which depicts one mode of operation of the Small Computer System Interface (SCSI), which is a commercially available communication protocol. Hardware components, including a computer 3, a fixed disc drive 6, a printer 9, and other components 12A–12C, are connected to a SCSI bus 15. As an example of operation, when the computer 3 wishes to retrieve data from the disc drive 6, the computer 3 places the "name" of the disc drive 6 onto the SCSI bus 15, followed by the appropriate commands. All components connected to the SCSI bus 15 "hear" the name, but only the disc drive 6 responds to the commands.

These commands are taken from a pre-defined set of SCSI commands. Some of the hardware components in FIG. 1 are "SCSI devices;" they are specifically designed to recognize, and respond to, SCSI commands. All of the devices in FIG. 1, except the computer 3, are assumed to be SCSI devices.

As shown in FIG. 2, all SCSI devices contain a Low Level Driver, LLD, which runs on a processor (not shown) contained within each device. Each LLD receives the SCSI commands from the SCSI bus 15, and, in response, issues the appropriate internal commands to its respective device.

The computer 3 is not a SCSI target. Although some computers are equipped to interact with each other using a SCSI bus, the generalized computer 3 is not supplied with equipment to do so.

A second reason that the computer 3 does not interact with SCSI devices directly is that the internal busses of different types of computer can be different, even if the computers conform to a common architecture, such as the "Personal Computer" architecture established by IBM Corporation. For example, the bus structure of a Personal Computer running an 8086 processor is different from that of a Personal Computer running a '486 processor.

In addition, these mutually different bus structures are, almost certainly, different from the structure of the SCSI bus 15. Therefore, even if a person wanted to connect the generalized computer 3 directly to the SCSI bus 15, extreme difficulties would be encountered.

To resolve this incompatibility, the computer 3 is equipped with an adapter card 21 in FIG. 2. This adapter 21 allows the computer's internal system bus to communicate with the SCSI bus 15.

The adapter 21 lies between the computer 3 and the SCSI bus 15. The adapter communicates with the SCSI bus 15 using commands taken from the SCSI command set. However, the adapter communicates with the computer 3 using commands taken from a different command set, which is determined by the manufacturer of the adapter. The adapter translates between the two command sets.

The low-level drivers LLD also act as translators, in a sense. That is, the SCSI commands are multi-bit words. However, in many instances, a multi-bit SCSI command is used to execute a simple operation within a component, such as printer 9. A multi-bit SCSI command may cause a switch closure, which a single-bit command can handle. One function of the low-level drivers LLD is to translate the multi-bit SCSI commands into individual single-bit commands, when necessary.

Therefore, this simplified background has illustrated the following:

1. Computer 3 selects a hardware component by placing a name onto the SCSI bus.
2. All components connected to the SCSI bus hear the name, but only the named component responds to commands which follow the name.
3. SCSI commands are transmitted to the named component, along the SCSI bus.
4. Formulation of the SCSI commands, at the computer, generally requires a translation from one command set, into the SCSI set, through an adapter.
5. Another type of translation occurs at the hardware receiving the SCSI commands, to make the commands understandable to the hardware.

The present invention utilizes the framework of the SCSI bus and command set, in order provide additional functionality, in the form of a Target Service Module TSM in FIG. 3. The TSM is a software device which is able to fully exploit the program-handling capability of the processor on which it runs, both in terms of speed and memory.

OBJECTS OF THE INVENTION

An object of the invention is to provide an improved computer system.

A further object of the invention is to provide additional functionality for a SCSI interface.

SUMMARY OF THE INVENTION

In one form of the invention, SCSI commands are used as a communication vehicle, and are used to carry commands and information between computers and virtual devices. The commands can be different from those normally assigned to the respective SCSI commands.

DETAILED DESCRIPTION OF THE INVENTION

Figure 1:
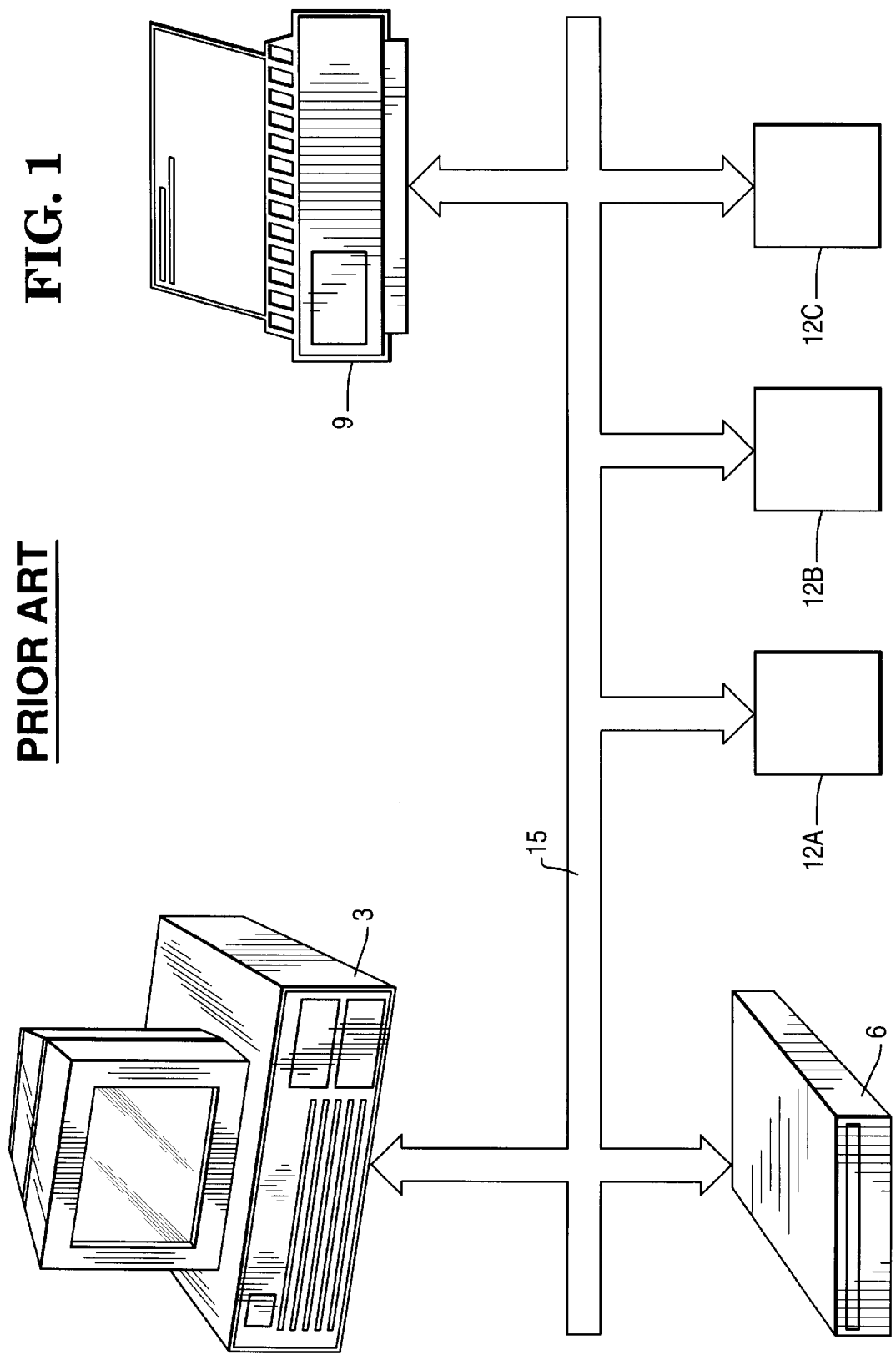
FIGS. 1 and 2 illustrate prior-art busses.
Figure 2:
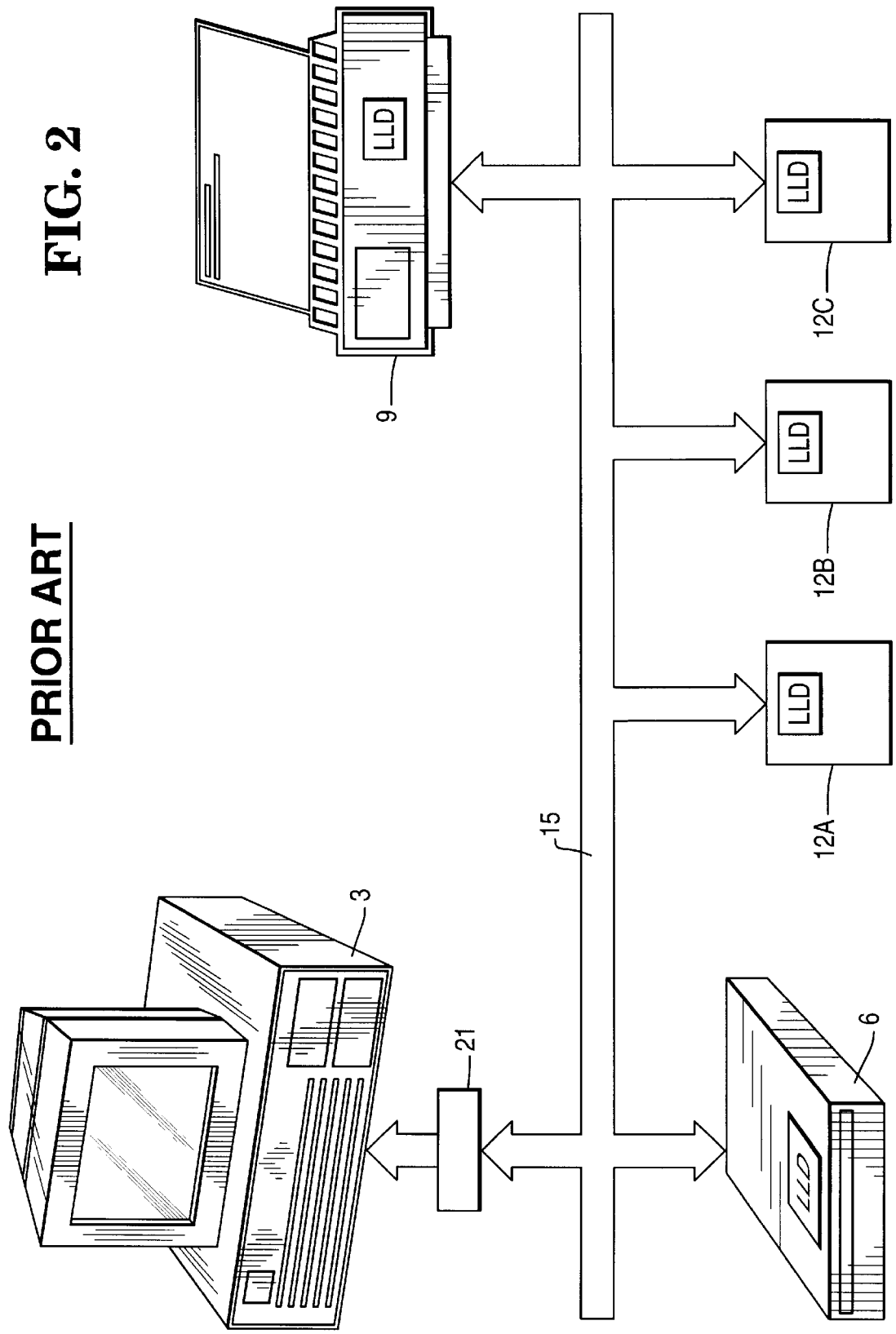
Figure 3:
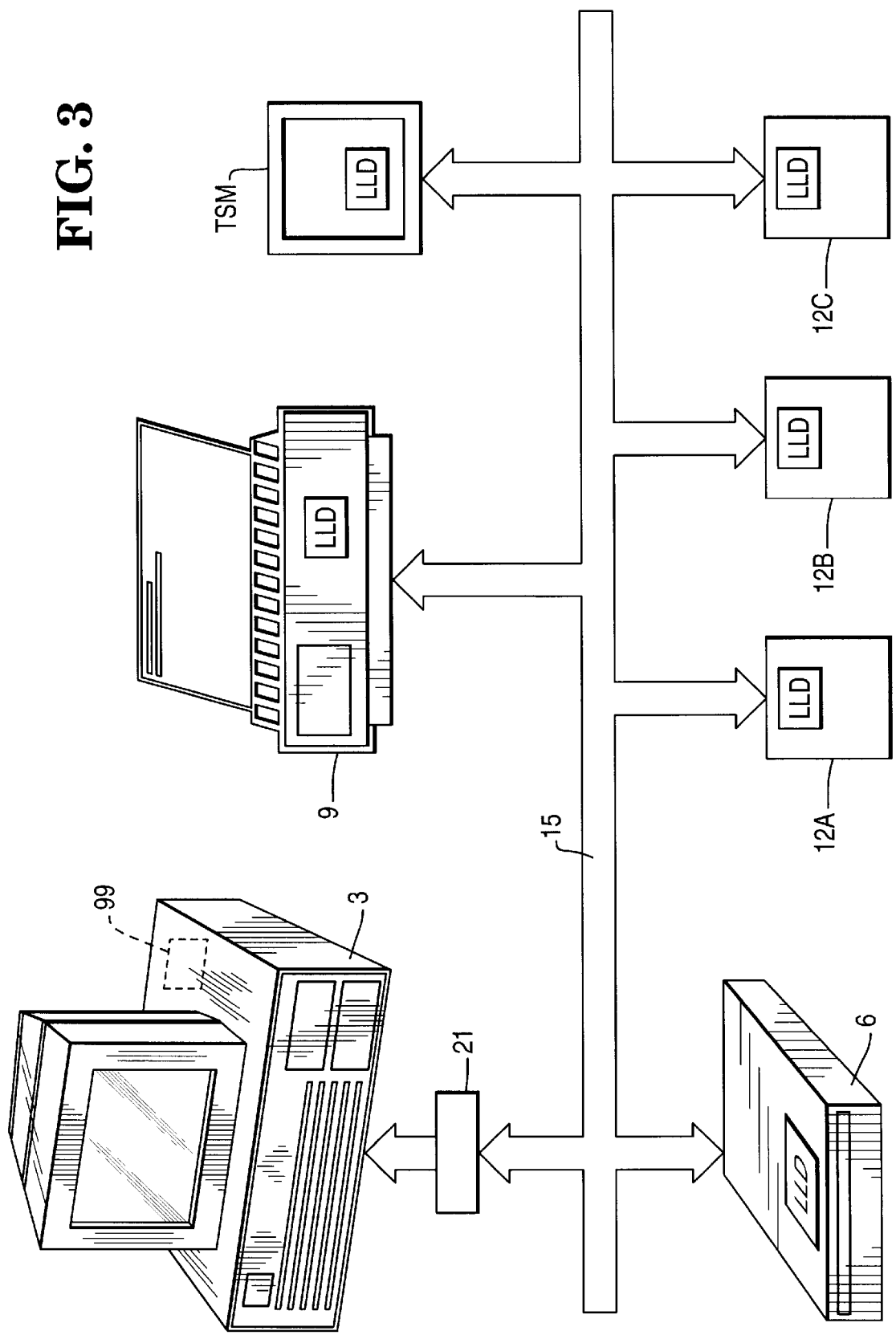
FIG. 3 illustrates one form of the invention.

FIG. 3 illustrates one form of the invention. A Target Service Module TSM is connected to a SCSI bus 15, through a low-level driver LLD. The TSM is a computer program, and runs on a processor (shown in FIG. 5). Depending on the architecture of the device used to run the TSM, an adapter resembling adapter 21 in FIG. 3 may be required to interface the TSM with the SCSI bus 15. The TSM receives SCSI commands from the SCSI bus.

Figure 4:
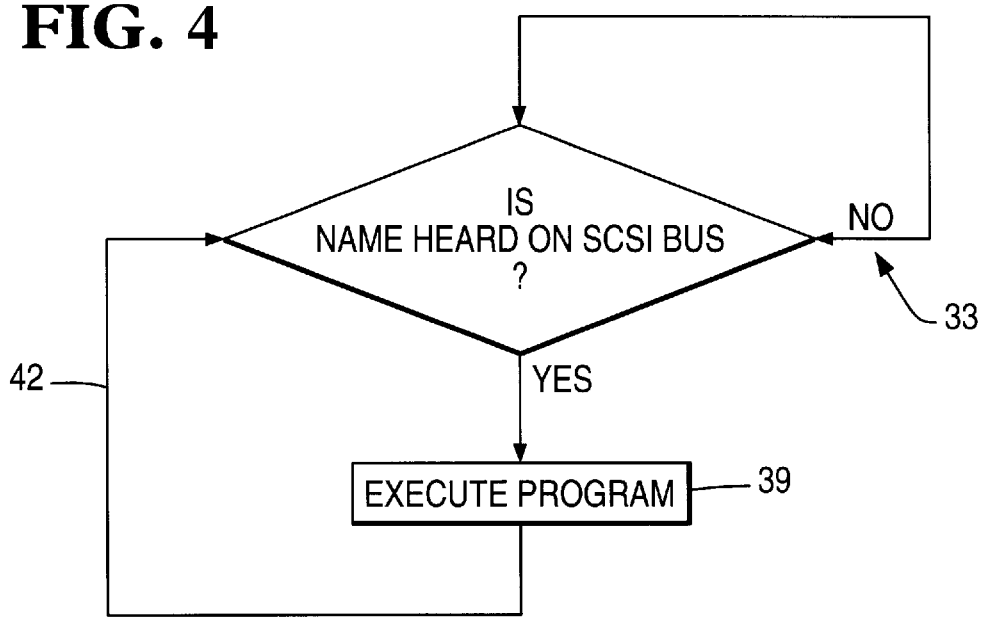
FIG. 4 illustrates a high-level flow chart of operation of one form of the invention.

The TSM is assigned a name, as are the other components shown in FIG. 3. Operation of the TSM can be explained with reference to FIG. 4. The TSM idles in loop 33, and then launches itself, by exiting the loop 33, when it hears its name on the SCSI bus. Upon exiting, it executes the operations programmed into it, as indicated by block 39. After completing the operations, it returns to idling in loop 33, as indicated by arrow 42.

A significant feature is that the TSM, upon launching itself, may receive, and respond to, SCSI commands. However, the TSM does not necessarily respond to the SCSI commands in the same way that a SCSI device responds. An example will illustrate this difference, in which the TSM is programmed to operate as a clock.

When the TSM hears its name on the SCSI bus 15, it goes into operation. It then listens for a specific SCSI command on the SCSI bus, such as COMMAND A. Ordinarily, COMMAND A causes a normal SCSI device to take a specific action, such as feeding a sheet of paper into a printer. However, the TSM is programmed such that COMMAND A causes a different action. In the TSM, receipt of COMMAND A causes the TSM to look up the time-of-day, in its processor's internal clock, and then place the time-of-day onto the SCSI bus. After doing this, the TSM returns to the idle state indicated by loop 33 in FIG. 4.

To restate: ordinary SCSI commands cause specific actions in normal SCSI devices, such as a particular response to a COMMAND A. However, the TSM, in general, undertakes a different response to this COMMAND A (although, of course, the TSM could be programmed to respond to COMMAND A in the same way as a SCSI device does). Thus, the same command causes different operations to occur within the overall system, depending upon the device (TSM or normal SCSI device) receiving the command.

As an alternate approach to that described above, the sequence of name-plus-COMMAND-A may not be necessary. Instead, the TSM may be programmed to launch into execution merely upon hearing its name on the SCSI bus.

Figure 5:
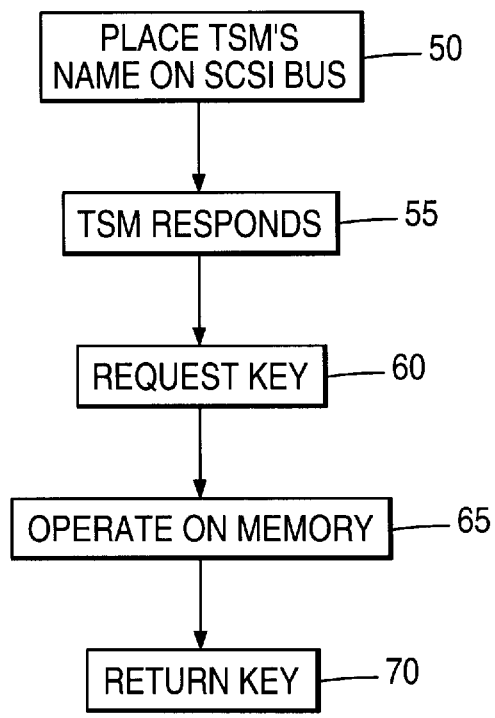
FIG. 5 is a flow chart illustrating logic implemented by one form of the invention.

One implementation of the invention is illustrated in FIG. 5. The TSM acts as a distributed lock manager for controlling access to memory. That is, when a party wishes to gain access to a bank of memory, that party must first place a lock on the memory, so that other parties do not tamper with the block of memory while the first party is using the block. This restriction on access is required in order to assure data coherency in the memory bank.

Returning to FIG. 5, when a party wishes to place a lock on a block of memory, the party first places the TSM's name onto the SCSI bus, as indicated by step 50 in FIG. 5. The TSM acknowledges being called, as indicated in step 55. The party requests a key to a block of memory, as indicated by step 60. In making this request, the party identifies the block of memory desired.

The TSM issues the key, and refuses to issue keys to this block to other parties, while the key remains issued. The party who received the key operates on the block of memory, as indicated by step 65. When the party finishes operating on the block of memory, the party returns the key to the TSM, who will then make the block available to other parties, if requested.

Significant Features

Figure 6:
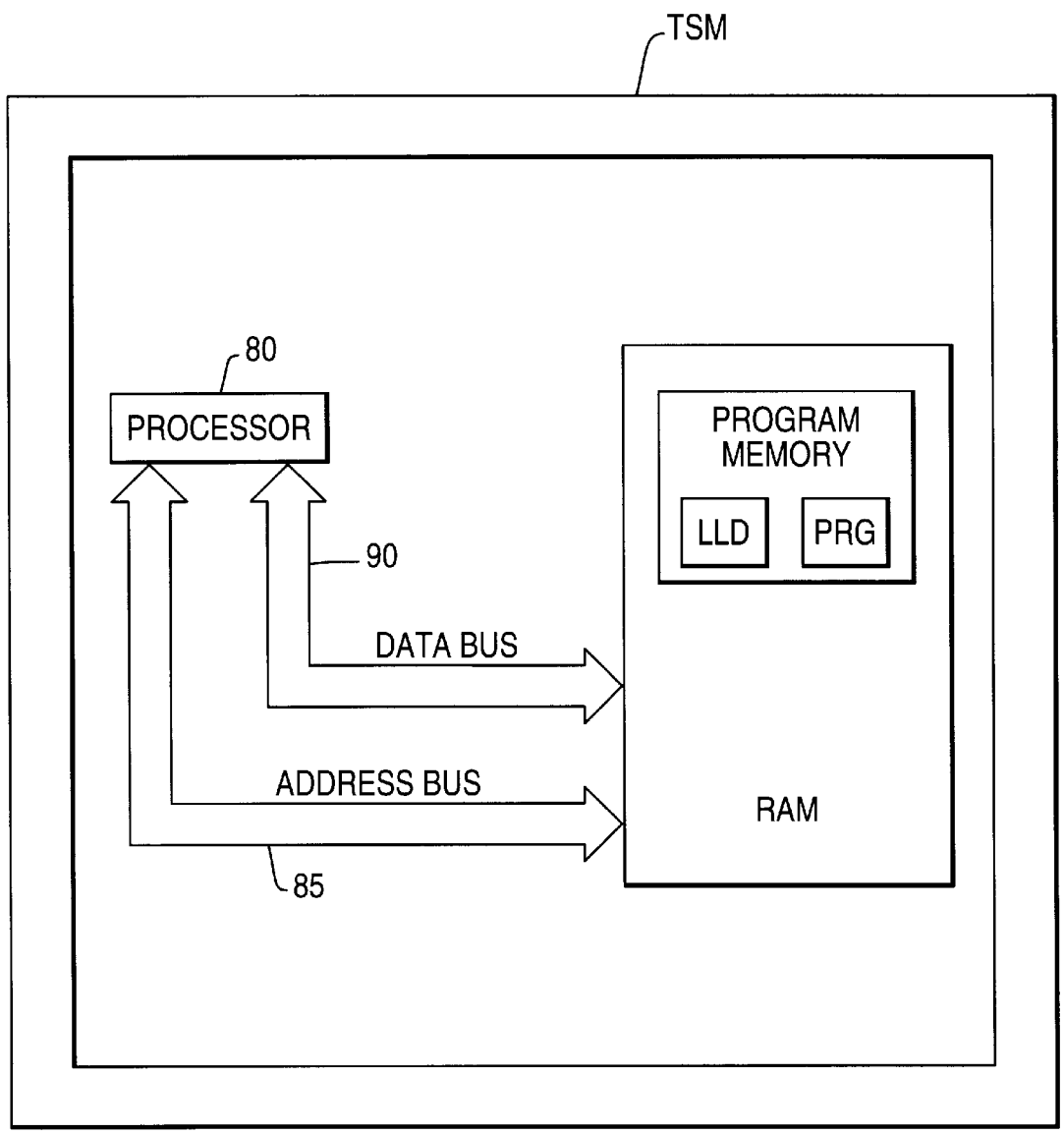
FIG. 6 illustrates, in simplified form, one architecture of the TSM of FIG. 3.

1. The term "TSM" refers to an entity which performs the operations described above. That entity can take the form of software, which runs on the processor (not shown) of computer 3 in FIG. 3. Alternately, the entity can take the form of software running on a computer having a minimal architecture, such as shown in FIG. 6. The minimal architecture comprises a processor 80, an address bus 85, a data bus 90, and Random Access Memory RAM. The RAM contains the LLD and the program PRG, which the TSM executes. If required, an adapter, resembling adapter 21 in FIG. 3, is provided. Of course, other components are used, which are not shown, such as external connectors and power supplies.

Miniature, single-board computers are commercially available, which conform to the Personal Computer architecture, from Octagon Systems, 6510 West 91st Avenue, Westminister, Colo.

2. The TSM can be located on the computer 3. Thus, this computer 3 performs not only its usual functions, but also those of the TSM. For example, if computer 3 is used as a workstation by a party who performs Computer-Aided Drafting, computer 3 will run an application program, such as CAD program 99. In addition, when the name of the TSM is placed on the SCSI bus 15, the TSM will launch into operation, running on the processor of computer 3.

3. More than one computer 3 can be connected to the SCSI bus.

4. It was stated above that a SCSI device will respond to a given SCSI command in one manner, but that the TSM can be programmed to respond in a different manner. Restated, the SCSI device makes one response to the SCSI command, and the TSM makes a different response. Two points about this difference should be observed.

One is that, as a technical matter, two presently existing SCSI devices can be said to respond to the same SCSI command in different ways. For example, two printers, manufactured by different companies, will certainly take a different series of internal steps in response to the same SCSI command. However, these differences are considered as mere differences in details of execution. The overall result is the same in both printers, and conforms to the result intended by the SCSI command.

A second difference is that the TSM may be implemented as a pure logic device. That is, it performs pure computation, and does not control hardware (except to the extent that hardware is part of its architecture, such as a disc drive, etc.) In this case, a given SCSI command will cause a SCSI hardware device to take action, while the same SCSI command will cause the TSM to execute a computer program, which has no hardware involvement, such as the clock program discussed above.

5. "SCSI" is an industry standard. One specification of the SCSI standard is set forth in ANSI 3 XT 10.

Numerous substitutions and modifications can be undertaken without departing from the true spirit and scope of the invention. What is desired to be secured by Letters Patent is the invention as defined in the following claims.

I claim:

1. In a system which includes a SCSI bus, and a computer connected to the SCSI bus, the improvement comprising:
   a) a SCSI device (6), connected to the SCSI bus, which, when addressed,
      i) responds to a particular SCSI command and
      ii) performs an operation specified by the SCSI command; and
   b) a second device, connected to the SCSI bus, which, when addressed,
      i) responds to said SCSI command and
      ii) performs an operation other than that specified by said SCSI command.

2. A method of operating a bus which uses a version of the SCSI command set, which contains commands which cause respective predetermined actions in hardware connected to the bus, comprising the following steps:

a) at some times, using commands from the command set to induce said predetermined actions; and b) at other times, using said commands to communicate with a computer program which
   i) runs on a processor; and
   ii) controls none of said hardware.

3. Method according to claim 2, in which the command set comprises a version of ANSI 3 XT 10.

4. A system, comprising:

a) a computer (3);

b) a SCSI bus (15), connected to the computer;

c) a SCSI device, connected to the SCSI bus, which responds to SCSI commands on the SCSI bus;

d) an application program (99), running on the computer (3); and e) a process, running on the computer, which responds to SCSI commands placed onto the SCSI bus without emulating the responses by the SCSI device to said SCSI commands.

5. A system, comprising:

a) a computer, b) a SCSI bus, c) a SCSI device, connected to the SCSI bus, which responds to respective SCSI commands in predetermined ways, and d) a program, stored in memory available to a processor, which becomes launched in response to one or more SCSI commands received from the SCSI bus, wherein said one or more SCSI commands, if applied to the SCSI device, cause an operation other than launching of the type in paragraph (d).

6. System according to claim 5, in which the SCSI device responds to some SCSI commands by causing hardware to take predetermined mechanical actions, and the program responds to the same commands without causing mechanical actions in hardware.

7. System according to claim 1, wherein the second device responds to the SCSI command by placing data indicative of a chronological time onto the SCSI bus.

8. System according to claim 1, wherein the SCSI device responds to the SCSI command by generating physical motion in a machine, and the second device responds to the SCSI command without generating physical motion in a machine.

9. System according to claim 1, wherein the second device comprises software which i) launches itself from an idle state when addressed on the SCSI bus;

ii) executes operations programmed into it after launching; and then iii) returns to an idle state.

10. System according to claim 9, wherein the software acts as a distributed lock manager for controlling access to memory.

11. System according to claim 1, wherein the second device responds to a predetermined name appearing on the SCSI bus by actions which include the following:

i) receiving identification of a block of memory;

ii) issuing a key to said block of memory; and iii) issuing no further keys to said block of memory while said key remains issued.

* * * * *